3,318,671
PROCESS AND APPARATUS FOR FORMING GLASS
SHEETS ON A MOLTEN METAL BATH
Edgard Brichard, 155 Chaussee de Gilly, Jumet, Belgium,
and Emile Plumat, 273 Chaussee de Ransart, Gilly,
Belgium
Filed Oct. 7, 1963, Ser. No. 314,224
7 Claims. (Cl. 65—65)

This invention relates to a process and apparatus for shaping a glass strip by the flow of molten glass through a slot in the bottom of a melting tank containing the molten glass.

In known drawing processes of the above noted kind, the strip is cooled intensely, immediately upon its being shaped, and is then passed between pairs of rollers which control the speed of advance of the glass strip and therefore the rate of shaping of the strip. These processes have various disadvantages. First of all, the glass strip must be formed at a relatively low temperature and at a moderate speed in order that the glass reaches the rollers in a plastic state so that the rollers do not damage the glass surface. The output of apparatus of this kind is therefore low. Also, shaping a glass strip by passing the same through a slot produces surface faults in the strip which do not disappear during subsequent working. It has been proposed to form a glass strip by rolling plastic glass between cooled rollers, whereafter the strip is placed on a molten metal bath, reheated and remelted to remove surface faults inter alia rough parts, produced by the shaping means. This process has disadvantages which will be immediately apparent. In particular, the roller-shaping step greatly upsets the flatness of the surface and considerably cools the same. The glass strip must therefore be left on the molten metal bath long enough to be heated to a sufficiently high temperature and to remain at such temperature until the surface faults have disappeared. Clearly, therefore, this process is not very economical. Also, the molten metal bath on which the glass strip floats must be very long. Further, since the glass strip must remain on the molten metal bath at a relatively high temperature for a relatively long time, the glass surface may be damaged by metal oxides which are formed on the metal bath. For example, the metals most used, such as tin, are very oxidizable when in liquid state. Another disadvantage is that rolling cannot produce a glass strip as thin as desired.

To obviate these disadvantages, it has been suggested that a glass strip be formed by being drawn from a mass of molten glass and then placed on a molten metal bath to obviate shaping faults. Drawing processes have considerable advantages over rolling processes. However, a drawn glass strip is not entirely free from faults, and it has been suggested that the strip be maintained at a high temperature on the molten metal bath in order to remove faults which originate during drawing. In this event, the drawing elements must be placed between the molten mass of glass and the molten metal bath, for if the drawing elements are disposed after the molten metal bath, the glass strip experiences a pull as it passes over the molten metal. If, while it is thus passing, the viscosity of the glass is reduced by a temperature increase to remove faults in the glass, the drawing force is not transmitted by the glass strip moving over the molten metal but is absorbed by the strip, which elongates on the metal bath, with the result that the strip decreases in thickness or may even break. Since the drawing members must therefore be disposed between the mass of molten glass and the metal bath, they disturb the surface of the glass strip formed, although not to the same extent as in glass rolling.

If the drawing members are placed after the molten metal bath, the glass strip on the molten metal must be maintained at a temperature such as to cease to be drawable. Under these temperature conditions, faults cannot be eliminated and the molten metal bath serves merely as a conveying device that contributes nothing to the thermal polishing of the glass strip.

This invention contemplates overcoming the above disadvantages and further has additional advantages which will become more clearly apparent from the following description.

Generally, the invention relates to a process for shaping a glass strip wherein the glass strip is formed by flowing molten glass through a slot in the bottom of a melting tank containing the molten glass. In the process according to the invention, the glass strip is curved, and is then placed on a molten bath. In the process according to the invention, the drawing force is formed principally by the weight of that part of the strip which is between the slot and the place where the strip contacts the molten bath. There is no need for the glass strip to be cooled intensively as is the case when the downward drawn strip contacts rollers of the known down-drawing chambers. The glass strip can be shaped in accordance with the invention at a temperature high enough to remove surface irregularities; that is, the removal of irregularities starts immediately when the glass strip is shaped. The glass strip is then cooled by the temperature drop in the bath of molten substance and in the atmosphere thereabove. After sufficient setting, the strip is taken up by mechanical conveying means. To keep the glass away from air currents, which might hinder the removal of surface faults, the glass strip moves through at least one substantially closed chamber between the slot in the bottom of the melting tank and the place where the strip contacts the surface of the bath of molten subsance. Preferably, the atmosphere in the chamber through which the glass strip passes is heated.

The invention also relates to an apparatus for performing the above shaping process. This apparatus comprises, in a manner known per se, a melting tank containing molten glass and having a base formed with a slot for the drawing of molten glass, and a vessel containing a bath of molten material denser than the glass and not able to damage the same. The apparatus according to the invention is characterized by the fact that the vessel is disposed below the level of the drawing slot so that the molten bath receives the glass strip issuing from the slot and directed towards the bath. Preferably, the apparatus according to the invention also comprises a glass strip drawing chamber which connects the melting tank with the vessel of molten substance, in order to insulate the shaped glass strip from air currents outside the installation.

Specific embodiments of the invention will now be desribed by way of example with reference to the accompanying diagrammatic drawings in which.

Like reference numerals denote like elements throughout the drawings.

Figure 1:
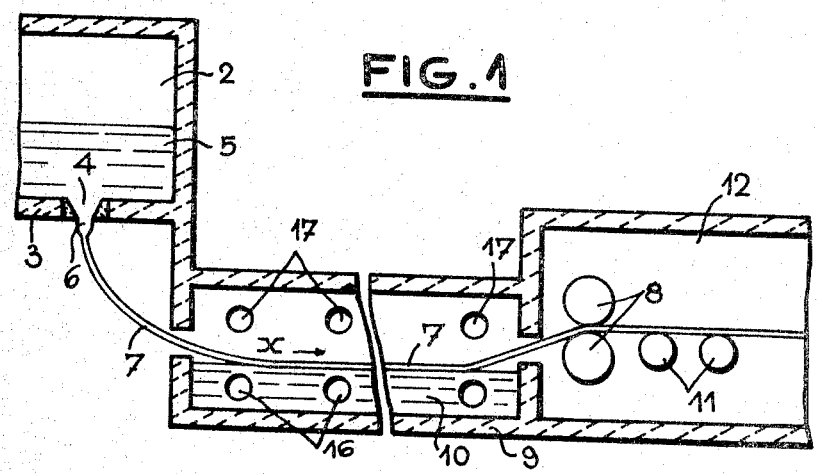
FIGURE 1 is a longitudinal sectional view, with some parts removed, of an apparatus in accordance with a first embodiment of the invention.

Referring to FIGURE 1, there can be seen an end of a glass-melting tank 2 having a bottom or base 3 formed with a slot 4 through which molten glass 5 can flow and be shaped into a glass strip 7 by drawing. The glass forms a bulb 6 below the slot 4. During continuous manufacture, the glass strip 7, which is formed after the bulb 6, is advanced by driving rollers 8 disposed beyond the exit of a vessel 9 containing a bath of a molten substance 10 which is denser than the glass and substantially inert thereto. The glass strip 7 floats on the bath as it moves in the direction indicated by arrow X. The molten substance is, for instance, a metal such as tin. To prevent rapid oxidation thereof, a non-oxidizing atmosphere, for instance, of nitrogen, is maintained above the molten metal in known manner. Alternatively, a non-oxidizing metal, such as silver or a mineral salt or a mixture of mineral salts, can be used for the bath.

The glass strip which is shaped below the base 3 is placed directly on the bath 10 at a place relatively near the slot 4 and without having contacted any solid part. The glass strip 7 does not have to be reheated on the molten metal bath. Any faults in the glass disappear while the strip descends towards the molten metal bath and, if any faults are left, they disappear on the bath before the strip begins to set. Thereby the strip is formed with smooth opposite surfaces.

The distance between the slot 4 and the place where the strip engages the bath 10 varies with the viscosity of the glass and consequently with the composition of the latter, the glass temperature in the glass melting tank 2 and with the drawing force exerted on the strip. The viscosity of the glass varies also with the conditions in which the just formed glass strip is allowed to cool. In the case of the usual composition for the manufacture of flat glass, for instance a glass comprising silica, soda, lime, magnesia, and alumina, if this glass is maintained at its working temperature in the melting tank and the strip is cooled in atmospheric air as shown in FIGURE 1, this distance is comprised between 0.5 and 2 metres. The distance is sufficient to enable the glass to cool and form in the strip smooth opposite surfaces.

The glass strip 7 is drawn, inter alia by gravity, between base 3 and the aforesaid place where the strip 7 engages the bath 10. After the strip 7 has set thereon, the strip 7 is raised from the bath by the rollers 8, then moved by further rollers 11 through a lehr 12.

The rotation speed of the rollers 8 and 11 must be greater than the advancement speed of the part of the strip 7 which is just formed at the discharge end of the bulb 6 because this ribbon is drawn namely under the action of the weight of its curved part between this bulb and the place where the strip comes into contact with the bath 10.

The rotation speed of the rollers 8 and 11 may be a little higher than the minimum speed necessary for evacuating the strip which would be formed only under the action of the weight of said curved part. In this case an additional drawing of the curved part and of the plane part on the bath 10 would be produced. This additional drawing would not have the above mentioned disadvantages for the case in which the strip is formed by horizontal drawing of a mass of glass, only by drawing members disposed after the bath of molten metal.

For starting the manufacture, the glass is allowed to flow vertically from the opening 4. When it has a sufficient length, it is seized by hooks operated by hand and passed through openings (not shown) but generally provided in the lateral walls of vessel 9. The strip 7 is moved on the bath 10 towards the rollers 8 and introduced between them. Afterwards the displacement of the strip is effected by these rollers as explained above.

It will be apparent that the drawing and curving of the glass strip below the base 3 will be facilitated if the glass is kept away from air currents between the base 3 and the place where the glass strip contacts the bath 10. This can readily be achieved in the embodiments illustrated in FIGURES 2 and 3, where a drawing chamber 13 connects the melting tank 2 and the vessel 9. The drawing chamber 13 contains means for heating the glass strip, such as radiant heat members 14, which help to delay the cooling of the strip and which can, if required, be used to provide the strip with a heat treatment before the strip contacts the bath. By keeping the temperature of the chamber 13 and of the walls thereof substantially the same as that of strip 10, the heating means 14 prevents the formation of air currents along the strip.

Figure 2:
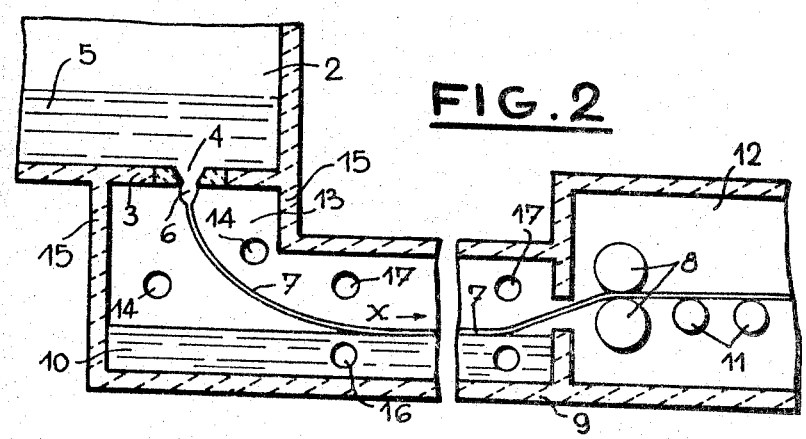
FIGURE 2 is a similar view of an apparatus in accordance with a second embodiment of the invention.

It will be apparent from FIGURE 2 that the vessel which contains the bath 10 extends beyond the vertical plane of the slot 4 through which the glass leaves the vessel 2. The drawing chamber 13 is then formed by walls 15 which connect the walls of the vessel 9 to the base 3. The atmosphere of the chamber 13 can readily be controlled and, in particular, its temperature can readily be adjusted.

The atmosphere in the chamber 13 cannot be disturbed by air currents flowing over the whole length of the vessel 9 since the same does not directly communicate with the outside. As FIGURE 3 also shows, a number of elements, such as 16 and 17, are provided for adjusting the temperature of the bath 10 and for controlling the temperature of the atmosphere in the vessel 9, for instance, by producing a progressive decrease in such temperature towards the lehr.

With a usual composition of glass for flat glass, the delayed cooling of the formed strip in the chamber 13 makes it possible to lengthen the distance between slot 4 and the contact point of the strip with the bath 10. This distance is preferably of about 1 metre.

Figure 3:
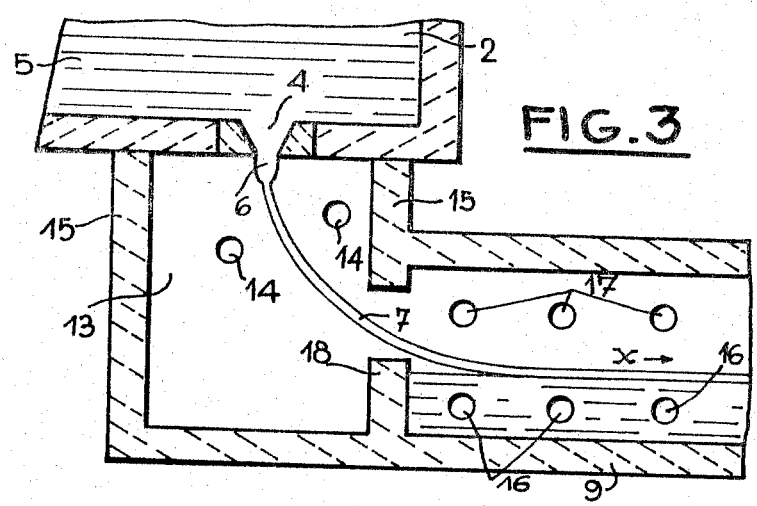
FIGURE 3 is a view on an enlarged scale of an apparatus in accordance with a third embodiment of the invention.

In the embodiment illustrated in FIGURE 3, a foreshortened wall 18 bounds the vessel 9 at the left-hand side thereof. In other words, in this embodiment the bath 10 does not extend to below the base 3. In this case the strip 7 is also kept away from cooling air currents before making direct contact with the bath 10.

Of course, the invention is not limited to the embodiments disclosed, and many variations can be made to the form, disposition and constitution of some of the component elements thereof without departing from the scope thereof as defined in the appended claims.

What we claim is:

1. A process of continuously forming a glass strip comprising discharging molten glass downwards through a drawing slot in the bottom of a glass melting tank, the molten glass forming a bulb immediately beneath said slot, drawing the glass downward from said bulb under the action of gravity, a sufficient distance to permit cooling of the glass and the forming of a strip having smooth opposite surfaces, laterally curving the strip so formed and depositing the curved strip, without it having contacted any solid elements, onto a bath of molten substance denser than glass and chemically inert to the same, sliding said strip on said bath, progressively decreasing the temperature of the bath in the direction of movement of the strip until the glass strip has attained a temperature for which it is no longer damaged by engagement with solid elements, and advancing said strip by engagement therewith after the glass has attained this last temperature.

2. A process as claimed in claim 1 comprising passing the curved strip in a substantially closed chamber for preventing the flow of air currents along the glass strip, between said drawing slot and the place where the strip contacts the surface of the bath of molten substance.

3. A process as claim 2 comprising heating said chamber to reduce the degree of cooling of the glass.

4. Apparatus for forming a glass strip comprising a glass melting tank, said tank having a bottom with a drawing slot therein through which molten glass is drawn downwards under the action of gravity, a vessel containing a molten bath disposed below the level of said slot and extending at least to one side thereof, said bath having a level a substantial distance below the bottom of the tank to enable the discharged glass to form a strip having smooth opposite surface, said bath being denser than glass and chemically inert to the glass, means for advancing on said bath, laterally of said drawing slot, the formed glass strip, without the strip contacting solid elements, means for cooling progressively the bath in the direction of movement of the strip, until the temperature of the strip is low enough for the glass to be engaged by solid elements without damage, said advancing means acting on the strip after the latter has left the bath.

5. Apparatus as claimed in claim 4 comprising a substantially closed drawing chamber connecting the bottom of the glass melting tank and the vessel containing the molten bath, said chamber enclosing the glass strip from said drawing slot to the vessel containing the molten substance.

6. Apparatus as claimed in claim 5 wherein said drawing chamber contains heating elements for delaying the cooling of the glass during its passage through said chamber.

7. Apparatus as claimed in claim 5 wherein said vessel extends with the bath therein beyond the vertical plane passing through the drawing slot.

References Cited by the Examiner
UNITED STATES PATENTS 3,220,816  11/1965  Pilkington _____ 65—99

DONALL H. SYLVESTER, *Primary Examiner.*

A. D. KELLOGG, *Assistant Examiner.*